Aug. 20, 1940.　　　C. HODGE　　　2,212,368
ELECTRIC STORAGE BATTERY
Filed May 28, 1936
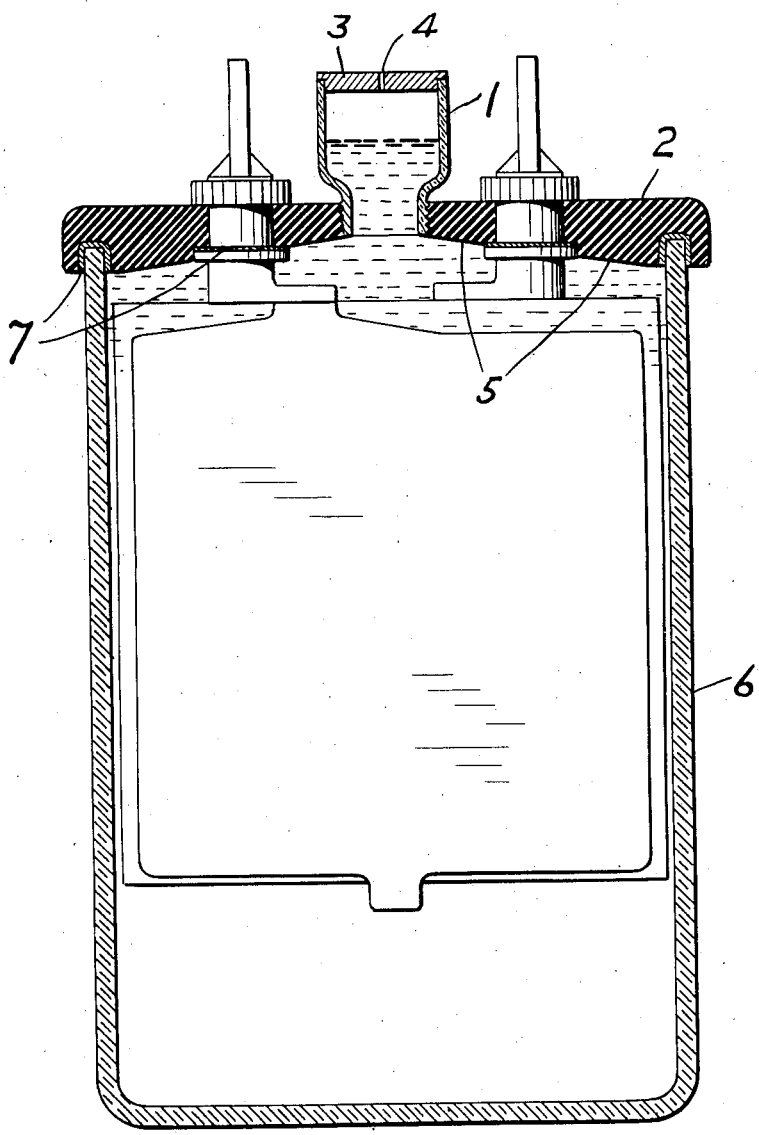
WITNESS:
INVENTOR
Carroll Hodge
BY
Augustus B S Houghton
ATTORNEY.

Patented Aug. 20, 1940

2,212,368

UNITED STATES PATENT OFFICE 2,212,368

ELECTRIC STORAGE BATTERY

Carroll Hodge, Radnor, Pa., assignor to The Electric Storage Battery Company, Philadelphia, Pa., a corporation of New Jersey Application May 28, 1936, Serial No. 82,177

2 Claims. (Cl. 136—177)

One object of the present invention is to avoid the accumulation of an objectionable quantity of an explosive mixture of gas in the top of the cell.

Another object of the invention is to accomplish the stated result by the provision of simple and comparatively inexpensive provisions and devices.

Other objects of the invention will appear from the following description at the end of which the invention will be claimed.

Generally stated, the invention comprises a vent structure provided through the cover of the cell and into which the level of the battery fluid rises and through which gases escape, with or without the provision of a surface or formation on the inner face of the cover sloping toward the inlet of the vent structure.

The invention also comprises the improvements to be presently described and finally claimed.

In the following description reference will be made to the accompanying drawing forming part hereof and in which the single figure is a transverse section of a cell embodying features of the invention.

Referring to the drawing, 1 is a cup shaped vent structure arranged through and extending outside of and above the cover 2 of the cell. The vent structure 1 is provided with a cover 3 having an aperture 4 therethrough. The inner surface 5 of the cover 2 slopes toward the inlet of the vent structure 1. The vent structure 1 is shown as having screw thread connection with the cover 2 but it may be otherwise mounted and arranged. The vent structure may be made of transparent material as glass in order that the level of the battery fluid therein may be conveniently observed.

In use the electrolyte or battery fluid fills the cell 6 and extends up into the cup shaped vent structure 1 to a level above the cover 2. In this way no space is provided within the cell in which an explosive mixture of gases can accumulate. On the contrary, the liberated gases escape through the vent structure and the sloping surface at the inner face of the cover facilities that escape. Should there be any accumulation of gases it is confined to the interior of the vent structure below the cover 3 thereof and is consequently negligible in quantity. The cover 3 serves to prevent the escape of spray and the aperture 4 permits of the escape of gas.

The cell is sealed at its union with the cell cover and this is indicated at 7.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. In a storage battery having plates of active material, a jar, a cell cover supporting said plates and sealed to the top of said jar and having its inner surface sloping upward, a hollow vent structure communicating with the interior of said jar through said cell cover at the top of said sloping surface and mounted above said cell cover, and electrolyte completely filling said jar and extending up into said vent structure above said cell cover.

2. In a storage battery having plates of active material, a jar, a cell cover supporting said plates and sealed to the top of said jar and having its inner surface sloping upward, a hollow vent structure suitable for use in putting electrolyte into the battery and communicating with the interior of said jar through said cell cover at the top of said sloping surface and mounted above said cell cover, and a vent structure cover forming a readily removable upper part of the vent structure for the purpose of putting electrolyte into the battery and having a perforation therethrough providing a vent from the interior of the vent structure.

CARROLL HODGE.